United States Patent
Wachman et al.

(10) Patent No.: US 12,028,019 B2
(45) Date of Patent: Jul. 2, 2024

(54) REMOTE SITE SURVEY FOR PHOTOVOLTAIC SYSTEM SITE

(71) Applicant: SunPower Corporation, San Jose, CA (US)

(72) Inventors: Jacob Wachman, San Francisco, CA (US); Terrence Brown, San Jose, CA (US); Bradley Folta, San Jose, CA (US); Deepesh Makkar, San Jose, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 340 days.

(21) Appl. No.: 17/589,176

(22) Filed: Jan. 31, 2022

(65) Prior Publication Data
US 2022/0247351 A1     Aug. 4, 2022

Related U.S. Application Data

(60) Provisional application No. 63/143,208, filed on Jan. 29, 2021.

(51) Int. Cl.
| | |
|---|---|
| *H02S 50/15* | (2014.01) |
| *G06V 10/74* | (2022.01) |
| *G06V 10/98* | (2022.01) |
| *G06V 20/70* | (2022.01) |
| *G06V 30/42* | (2022.01) |

(52) U.S. Cl.
CPC ............ *H02S 50/15* (2014.12); *G06V 10/761* (2022.01); *G06V 10/993* (2022.01); *G06V 20/70* (2022.01); *G06V 30/42* (2022.01)

(58) Field of Classification Search
CPC ...... H02S 50/15; G06V 20/70; G06V 10/761; G06V 30/42; G06V 10/993
USPC .......................................................... 700/286
See application file for complete search history.

(56) References Cited

U.S. PATENT DOCUMENTS

| | | | |
|---|---|---|---|
| 9,805,261 B1 * | 10/2017 | Loveland | G05D 1/0038 |
| 2010/0217566 A1 * | 8/2010 | Wayne | G06F 30/13 |
| | | | 703/1 |
| 2016/0140258 A1 * | 5/2016 | Morse | G06F 30/398 |
| | | | 703/1 |
| 2019/0394448 A1 * | 12/2019 | Ziegler | G06V 10/82 |

(Continued)

FOREIGN PATENT DOCUMENTS

| | | | |
|---|---|---|---|
| CN | 111191500 A | * | 5/2020 |
| CN | 114639023 A | * | 6/2022 |
| CN | 117035143 A | * | 11/2023 |

(Continued)

*Primary Examiner* — Ronald D Hartman, Jr.
(74) *Attorney, Agent, or Firm* — XSENSUS LLP

(57) ABSTRACT

Remotely surveying a photovoltaic system site includes receiving a photograph uploaded by a user device; analyzing the photograph using a trained machine learning model; receiving a confidence score from the trained machine learning model; determining if the photograph includes predetermined information, the predetermined information being used to perform a remote photovoltaic (PV) system site survey remotely; and in response to a determination that the photograph does not include the predetermined information, provide specific instructions regarding the missing information, wherein the specific instructions include guidance on how to retake the photograph to capture the predetermined information.

20 Claims, 11 Drawing Sheets

(56) References Cited

U.S. PATENT DOCUMENTS

2021/0089811 A1\* 3/2021 Strong ................. G06V 20/176

FOREIGN PATENT DOCUMENTS

| EP | 2521075 A1 | \* | 11/2012 | ............. G06Q 10/04 |
| FR | 3116925 A1 | \* | 6/2022 | |
| JP | 2016005426 A | \* | 1/2016 | |
| WO | WO-2019144317 A1 | \* | 8/2019 | ........... B64C 39/024 |
| WO | WO-2022112722 A1 | \* | 6/2022 | |

\* cited by examiner

Pre-upload

Uploaded

Feedback based on ML

REMOTE SITE SURVEY FOR PHOTOVOLTAIC SYSTEM SITE

CROSS-REFERENCE TO RELATED APPLICATION

Related application U.S. patent application Ser. No. 16/994,195, filed Aug. 14, 2020, is incorporated herein by reference in its entirety. This application claims the benefit of U.S. Provisional Application No. 63/143,208, filed Jan. 29, 2021, which is incorporated herein by reference in its entirety.

BACKGROUND

Conventionally, a photovoltaic system site survey requires sending a technician to a site to perform a site survey. The technician then gathers various information needed for the site survey. Alternatively, having a customer (e.g., user of the photovoltaic system at the photovoltaic system site) perform a site survey rather than a technician would save time and cost. However, customers can be unreliable. Accordingly, a solution is needed for accurate and reliable site surveys.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

SUMMARY

According to aspects of the disclosed subject matter, a method includes receiving a photograph uploaded by a user device; analyzing the photograph using a trained machine learning model; receiving a confidence score from the trained machine learning model; determining if the photograph includes predetermined information, the predetermined information being used to perform a remote photovoltaic (PV) system site survey remotely; and in response to a determination that the photograph does not include the predetermined information, provide specific instructions regarding the missing information, wherein the specific instructions include guidance on how to retake the photograph to capture the predetermined information.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
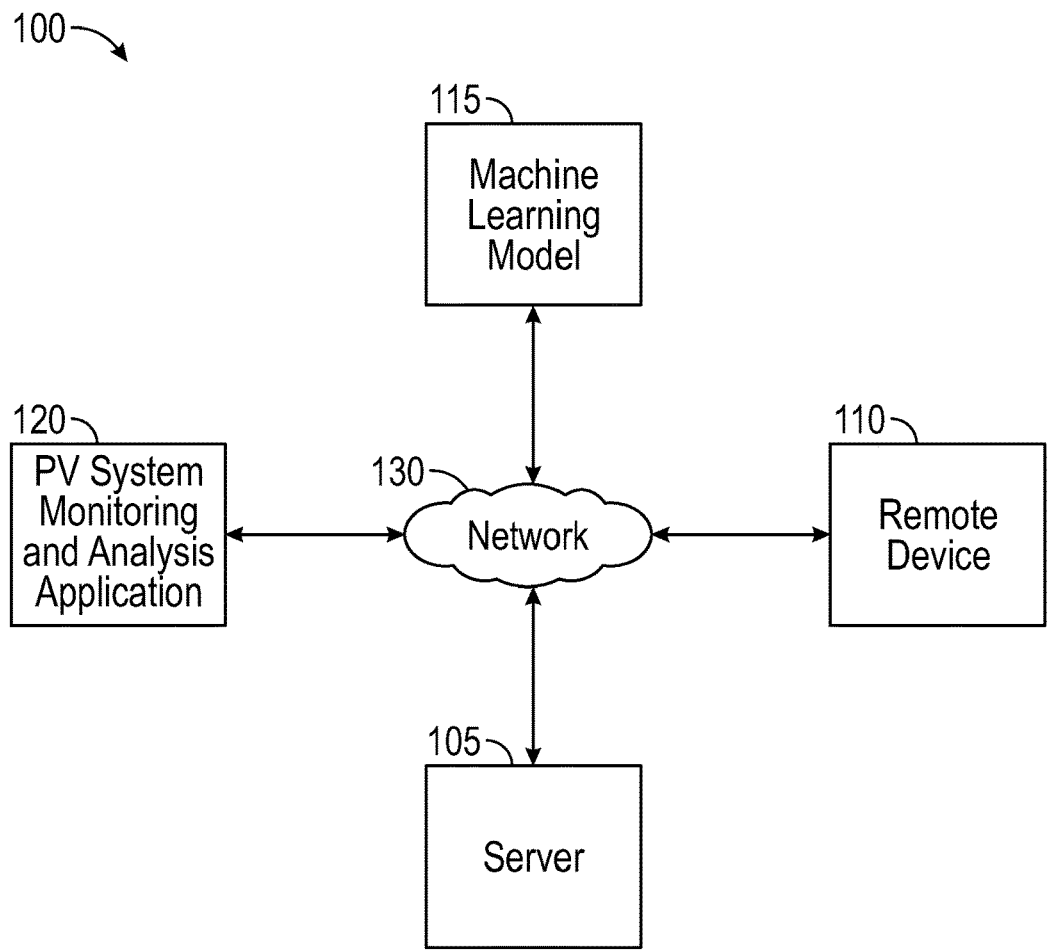
FIG. 1 illustrates an exemplary system for a remote site survey of a photovoltaic (PV) system site according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

FIG. 1 illustrates an exemplary system 100 for a remote site survey of a photovoltaic (PV) system site (herein referred to as the system 100) according to one or more aspects of the disclosed subject matter. The system 100 can include a server 105, a remote device 110, a machine learning model 115, a PV system monitoring and analysis application 120, and a network 130.

The server 105 can represent one or more servers communicably coupled to the remote device 110, the machine learning model 115, and the PV system monitoring and analysis application 120 via the network 130. The server 105 can be configured to perform various processing for the system 100 as further described herein. Additionally, the server 105 can represent a dedicated bank of servers, cloud-based processing, and/or a serverless computing system corresponding to a virtualized set of hardware resources.

The remote device 110 can represent one or more remote devices communicably coupled to the server 105, the machine learning model 115, and the PV system monitoring and analysis application 120 via the network 130. The remote device 110 can be a computer, laptop, smartphone, tablet, PDA, and the like. It should be appreciated that the remote device 110 can include a camera. The remote device 110 can be operated by a user to interact with the system 100 as further described herein. For example, the user can be a client or customer, and the user can use remote device 110 to perform a remote PV site survey as further described herein.

The machine learning model 115 can represent one or more machine learning models communicably coupled to the server 105, the remote device 110, and the PV system monitoring and analysis application 120 via the network 130. The machine learning model 115 can be a trained model used in the system 100 to assist in performing a remote PV system site survey as further described herein.

The PV system monitoring and analysis application 120 can correspond to the PV system monitoring and analysis application described in application Ser. No. 16/994,195, which is incorporated herein by reference in its entirety. For example, the server 105, the remote device 110, and the machine learning model 115 can receive information from and transmit information to the PV system monitoring and analysis application 120. Additionally, in one aspect, the PV system monitoring and analysis application 120 can be a software application executed on the remote device 110, and a portion the software application can include performing the remote PV site survey.

The network 130 can be a public network, such as the Internet, or a private network, such as an LAN or WAN network, or any combination thereof and can also include PSTN or ISDN sub-networks. The network 130 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

Generally, the system 100 can allow a user (e.g., a PV system customer) to take photos of their home in lieu of sending a technician to the PV system site to perform a conventional PV system site survey. The system 100 can prompt the user to take photos (e.g., using the remote device 110) of various items and PV system components that would be reviewed by a technician in a traditional PV system site survey. For example, the system 100 can prompt the user to take pictures of their electricity bill, electric meter, main service panel, roof, and attic, which can all be uploaded so that a remote PV system site survey can be performed based on the uploaded images. In other words, the remote site survey can inform the design and installation of the PV system. It can help determine where the system can be placed, how big the PV system (e.g., the hardware installed at the site) can be, determine whether the existing electric system at the site is set up for solar, determine whether the roof is in good enough condition for solar installation, logistical concerns (e.g., is it possible to reach the spaces that need to be accessed during installation), and the like.

Additionally, the system 100 can ensure that the users are uploading quality images that are clear and that include the information needed to perform the remote PV system site survey. By ensuring quality images are uploaded, there are significant cost and time savings because no follow up is required to get new photos or to get the required information. In other words, if the images are not acceptable so that the remote PV system site survey can be performed, then a technician has to be sent out to the site anyway to get the required information to perform the PV system site survey. To achieve acceptable photos from unreliable users, machine learning can be used to determine what an acceptable photo is and provide real-time feedback on the user's photos to improve the user's photos so that they are acceptable for the remote PV system site survey.

More specifically, the machine learning algorithm can determine whether the user's photos actually show the information needed to perform the PV system site survey remotely. For example, the information needed to perform the PV system site survey remotely can include 1) an electricity bill to find an account number, a meter number, a customer name, and a customer address; 2) an electric meter including the meter number; 3) a main service panel including the amperage; 4) a roof to identify an age of the roof; and 5) the attic to identify rafter span, length, and height.

In other words, from a user's perspective, the user can interact with the system 100 via their remote device 110 (e.g., via a software application (e.g., PV system monitoring and analysis application 120)), which can prompt the user to take various photos to gather the required information so that the PV system site survey can be performed remotely. Additionally, machine learning can be used to determine whether the photo is "acceptable" (e.g., includes the required information). In a case that the photo is not acceptable, the system 100 can prompt the user to take another photo to gather the required information. In one aspect, the prompt can include suggestions on how to improve the next photo (e.g., does not include the required information, move closer, move farther away, too dark, etc.). In other words, this provides a significant advantage because a technician does not have to be sent to the site to follow-up and the customer can be sure they have taken accurate photos at that time which avoids requesting that customers to take additional photos later.

Figure 2:
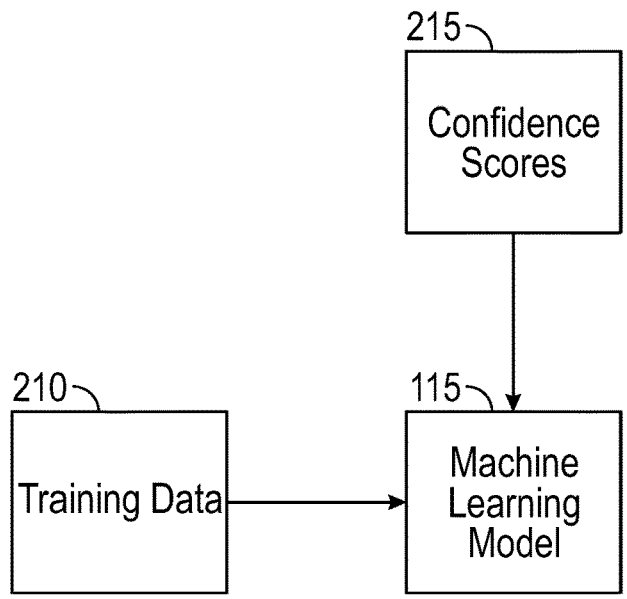
FIG. 2 illustrates an exemplary trained machine learning model according to one or more aspects of the disclosed subject matter.

FIG. 2 illustrates an exemplary trained machine learning model 115 according to one or more aspects of the disclosed subject matter. The machine learning model can be trained using training data 210 and confidence scores 215. In one aspect, the training data 210 can include photos corresponding to the various information needed for performing a remote PV system site survey. For example, a machine learning algorithm can be fed a training set of photos (e.g., training data 210) with the required information (e.g., account number, meter number, amperage, etc.) being labeled. Additionally, when a user takes a photo that is not acceptable, the declined photo can be fed back into the machine learning algorithm for training purposes. The trained machine learning model 115 can be configured to determine whether the user's photos actually show the information needed to perform the PV system site survey remotely. In other words, generally speaking, the machine learning model is trained to look for at least two things. First, it can be determined if the photo is of the correct item (e.g., electric meter vs. gas meter). Second, it can be determined if that photo contains the info needed for the corresponding portion of the site survey (e.g., electric meter number). In one aspect, the model can implement confidence scores at different thresholds depending on the type of photo being analyze. Additionally, the different thresholds can be updated in response to the outputs of the training (e.g., as the trained model improves, the thresholds for the confidence scores can be increased).

Figure 3A:
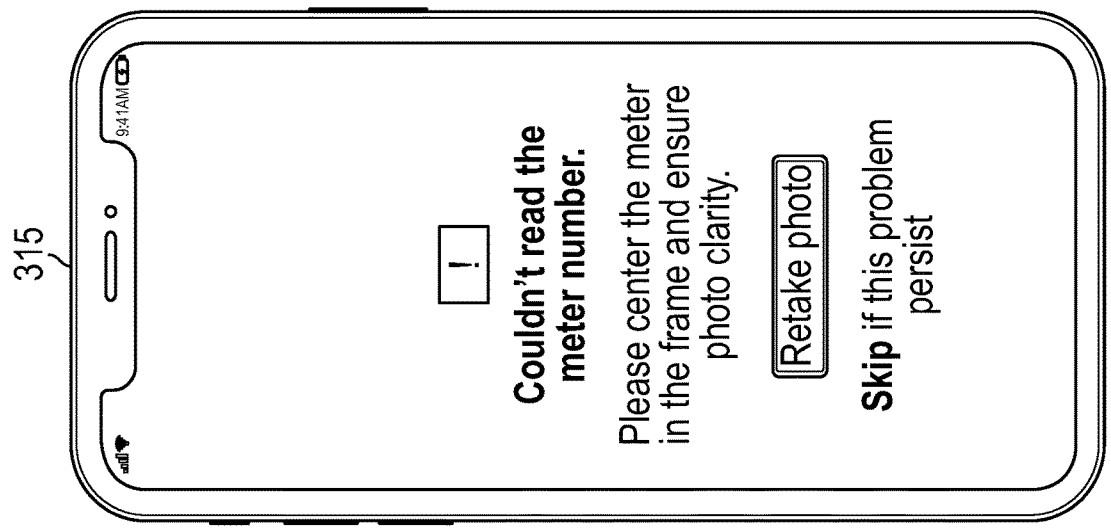
FIG. 3A illustrates an exemplary user interface displayed by the remote device according to one or more aspects of the disclosed subject matter.

FIG. 3A illustrates an exemplary user interface 305 displayed by the remote device 110 according to one or more aspects of the disclosed subject matter. The user interface 305 corresponds to a pre-upload state. For example, the user interface 305 can prompt the user to take a photo for the remote PV system site survey. In a non-limiting example, the user interface 305 can prompt the user to take a close-up photo of their electric meter, display corresponding instructions for taking the photo, and display a sample image for reference.

Figure 3B:
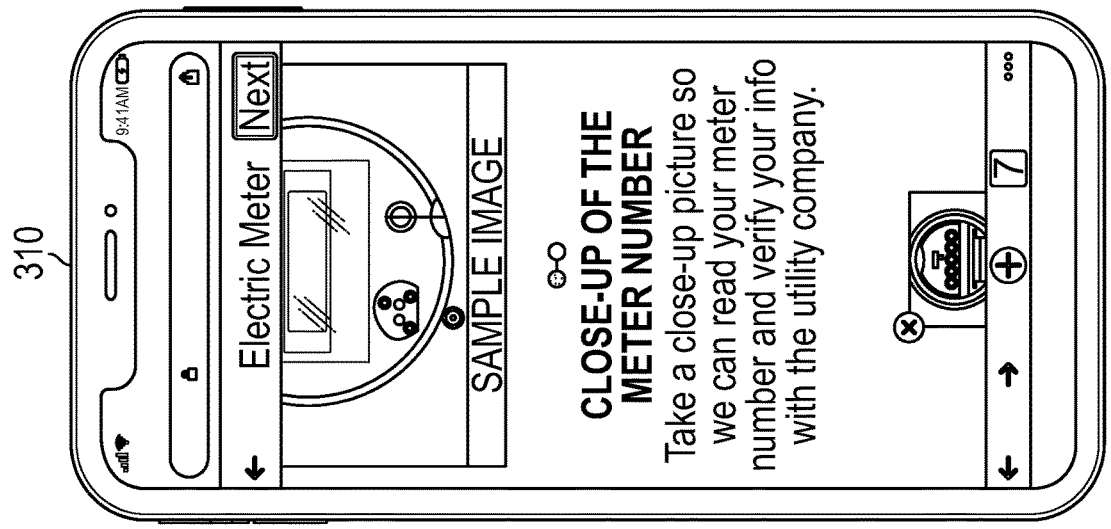
FIG. 3B illustrates an exemplary user interface displayed by the remote device according to one or more aspects of the disclosed subject matter.

FIG. 3B illustrates an exemplary user interface 310 displayed by the remote device 110 according to one or more aspects of the disclosed subject matter. The user interface 310 corresponds to an uploaded state where the user has taken the photo as prompted and uploaded the photo. After uploading the photo, the system 100 can determine whether the photo is acceptable for purposes of performing the PV system site survey remotely, as further described herein.

Figure 3C:
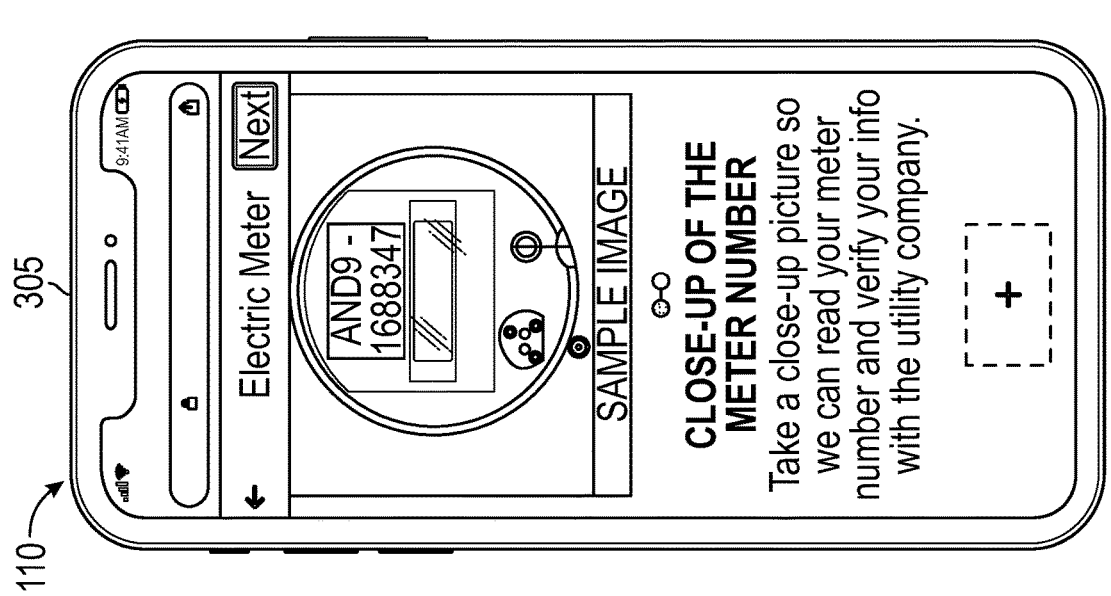
FIG. 3C illustrates an exemplary user interface displayed by the remote device according to one or more aspects of the disclosed subject matter.

FIG. 3C illustrates an exemplary user interface 315 displayed by the remote device 110 according to one or more aspects of the disclosed subject matter. The user interface 315 corresponds to feedback based on the machine learning algorithm. For example, the user interface 315 can include the user's photo and a prompt indicating that the photo is not acceptable. In one aspect, the prompt indicating that the photo is not acceptable can include the reason why the photo is not acceptable for performing the PV system site survey remotely. In a non-limiting example where the user interface 315 provides feedback regarding the close-up photo of the electric meter, the feedback can include that the meter number in the photo could not be read. In other words, because the meter number is required to perform the remote PV system site survey, the system 100 can prompt the user to retake the photo so that the meter number can be read and the PV system site survey can be performed remotely.

Figure 4:
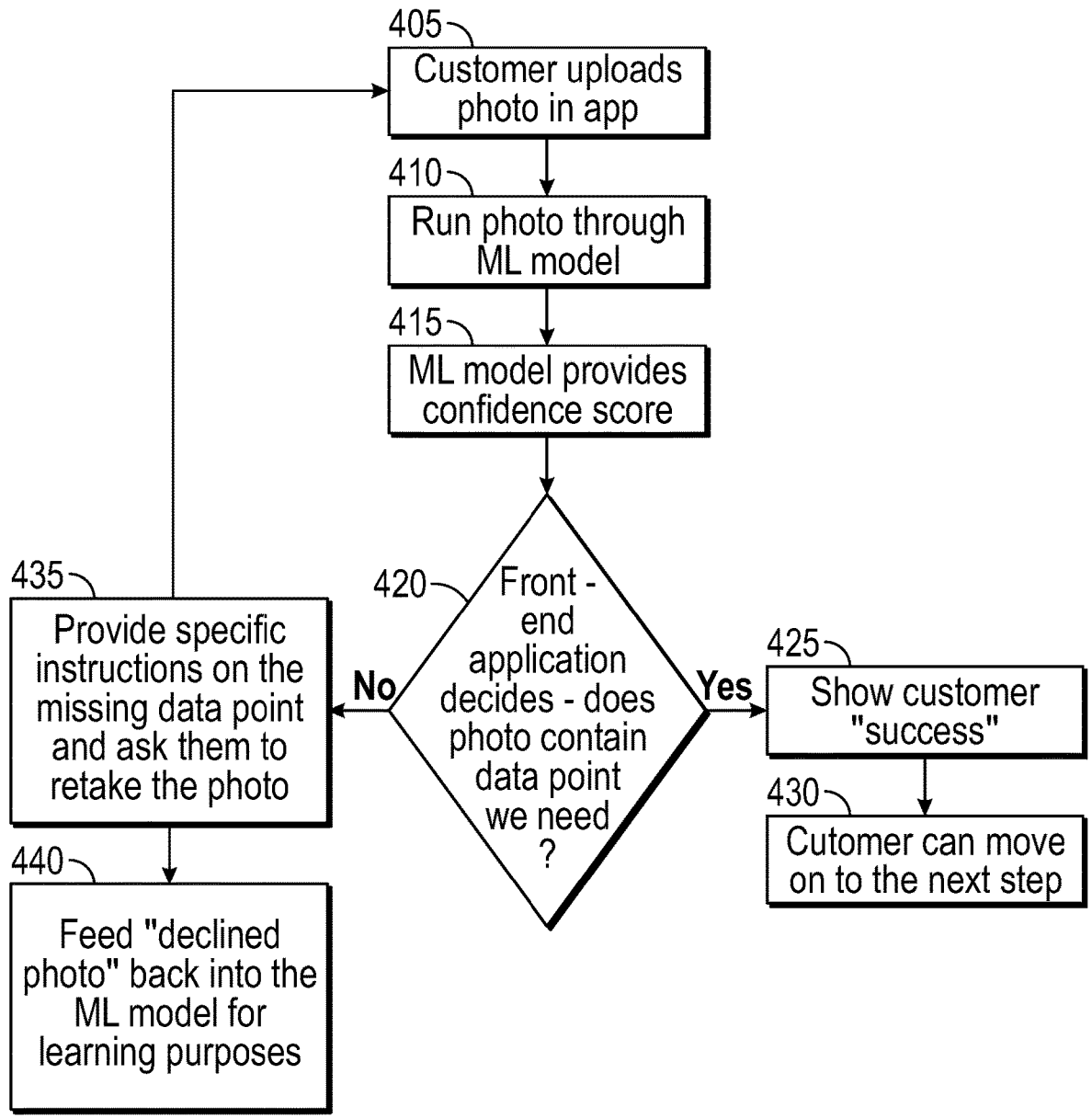
FIG. 4 is an algorithmic flow chart of a method for performing a PV system site survey remotely according to one or more aspects of the disclosed subject matter.

FIG. 4 is an algorithmic flow chart of a method for performing a PV system site survey remotely according to one or more aspects of the disclosed subject matter.

In S405, the system 100 can receive a user photo. For example, the user (e.g., customer) can upload a photo in a software application via the remote device 110. The software application can prompt the user for various types of photos, as further described herein, to gather information used for performing a PV system site survey remotely.

In S410, the uploaded photo is run through a trained machine learning model (e.g., trained machine learning model 115).

In S415, the trained machine learning model 115 provides a confidence scored based on the uploaded photo. In a non-limiting example, the trained machine learning model 115 can determine that the confidence score (e.g., confidence score 215) is 60/100 that the photo is of an electric meter and 100/100 confident that the meter number can be read. Additionally, the strength of the confidence score can increase as more training data is used. In other words, an acceptable confidence score can be stricter as more data is used to train the machine learning model.

In S420, the system 100 determines whether the photo contains one or more predetermined data point needed for the PV system site survey. In one aspect, a front-end application determines whether the photo contains the required data point or points based on the confidence score. In response to a determination that the photo does include the one or more data points needed from that photo for the site survey, the system 100 can indicate to the user that the uploaded photo was acceptable for purposes of the site survey in S425. For example, an indication of success can be displayed to the user via the remote device 110.

In S430, the user can proceed to a next step of the site survey. For example, the user can be prompted to take and upload another photo to gather information for a different portion of the site survey.

However, in response to a determination that the photo does not include the one or more data points needed from that photo for the site survey, the system 100 can provide specific instructions on the one or more missing data points and prompt the user to retake the photo (e.g., see FIG. 3C) in S435. After being prompted to retake the photo, the process can return to S405 where the system 100 receives a new photo uploaded by the user.

In S440, the system 100 can feed the declined photo back into the machine learning model for learning purposes to continuously improve the trained machine learning model 115.

After the user moves on to the next step of the site survey in S430, the process can end.

Figure 5:
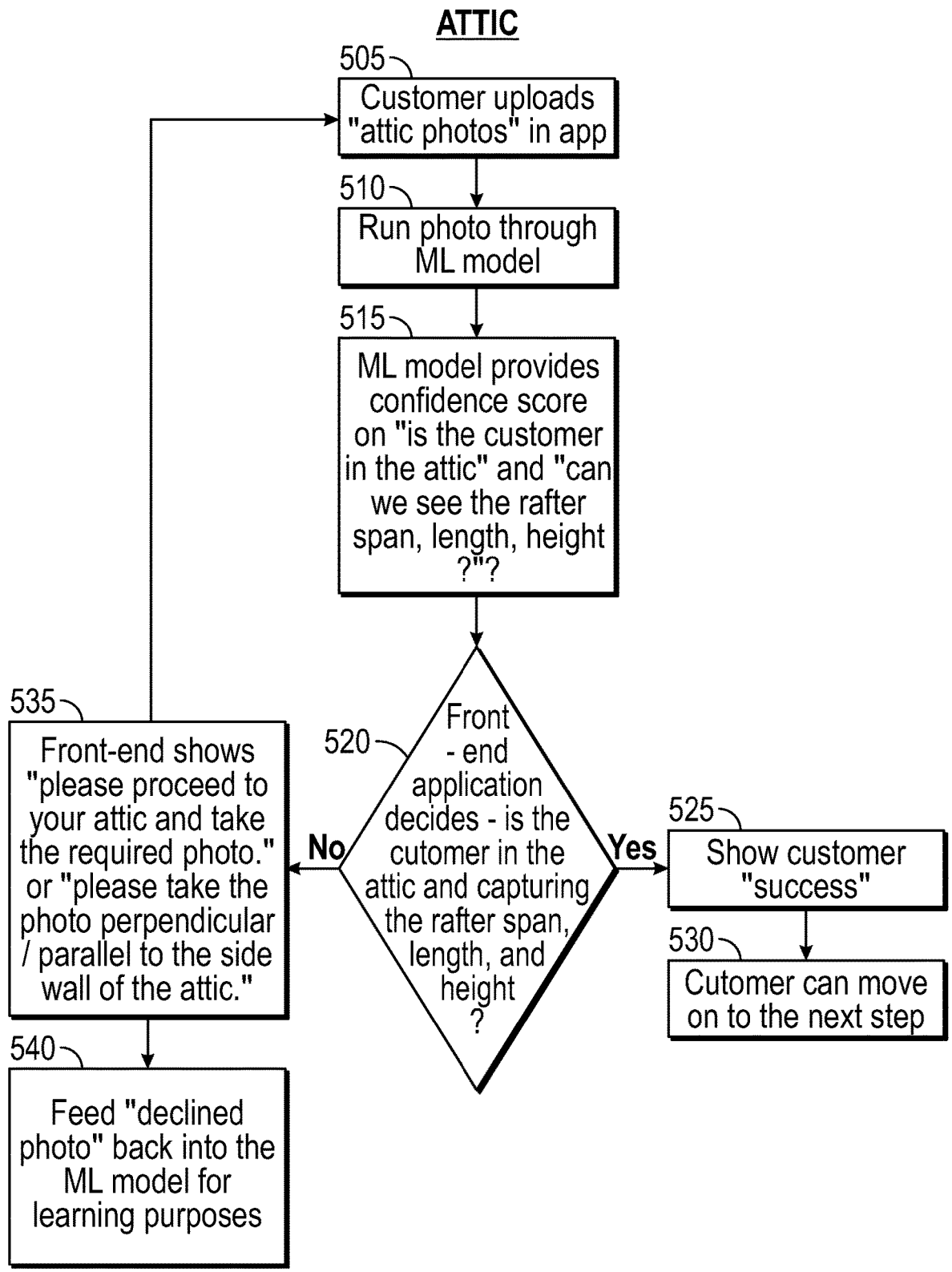
FIG. 5 is an algorithmic flow chart of a method for performing a portion of a remote PV system site survey corresponding to gathering information about a user's attic according to one or more aspects of the disclosed subject matter.

FIG. 5 is an algorithmic flow chart of a method for performing a portion of a remote PV system site survey corresponding to gathering information about a user's attic according to one or more aspects of the disclosed subject matter.

In S505, the system 100 can receive a photo uploaded by a user. For example, the user (e.g., customer) can upload a photo in a software application via the remote device 110. The software application can prompt the user for an attic photo to gather information about a user's attic needed for the remote site survey.

In S510, the system 100 can run the uploaded photo through the trained machine learning algorithm 115.

In S515, the trained machine learning model 115 can provide confidence scores on 1) whether the customer is in the attic and 2) whether the raft span, length, and height can be identified based on the photo.

In S520, the system 100 determines whether the customer is in the attic and whether the rafter span, length, and height can be identified based on the photo. In one aspect, the front-end application determines whether the customer is in the attic and capturing the rafter span, length, and height based on the confidence scores. In response to a determination that the user is in the attic and capturing the rafter span, length, and height, the system 100 can indicate to the user that the uploaded photo was acceptable for the portion of the remote site survey corresponding to gathering information about the user's attic in S525. For example, an indication of success can be displayed to the user via the remote device 110.

In S530, the user can proceed to a next step of the site survey. For example, the user can be prompted to take and upload another photo to gather information for a different portion of the site survey.

However, in response to a determination that user is not in the attic or if the user is in the attic but not capturing the rafter span, length, and height, the system 100 can provide specific instructions to assist the user in gathering the missing information in S535. In a non-limiting example, the front-end application can display "Please proceed to your attic and take the required photo." Or "Please take the photo perpendicular to the side wall of the attic." Or "Please take the photo parallel to the side wall of the attic." In other words, the front-end application can prompt the user to retake the photo in a way that gathers the information needed for that portion of the remote site survey. After being prompted to retake the photo, the process can return to S505 where the system 100 receives a new photo in the attic uploaded by the user.

In S540, the system 100 can feed the declined photo back into the machine learning model for learning purposes to continuously improve the trained machine learning model 115.

After the user moves on to the next step of the site survey in S530, the process can end.

Figure 6:
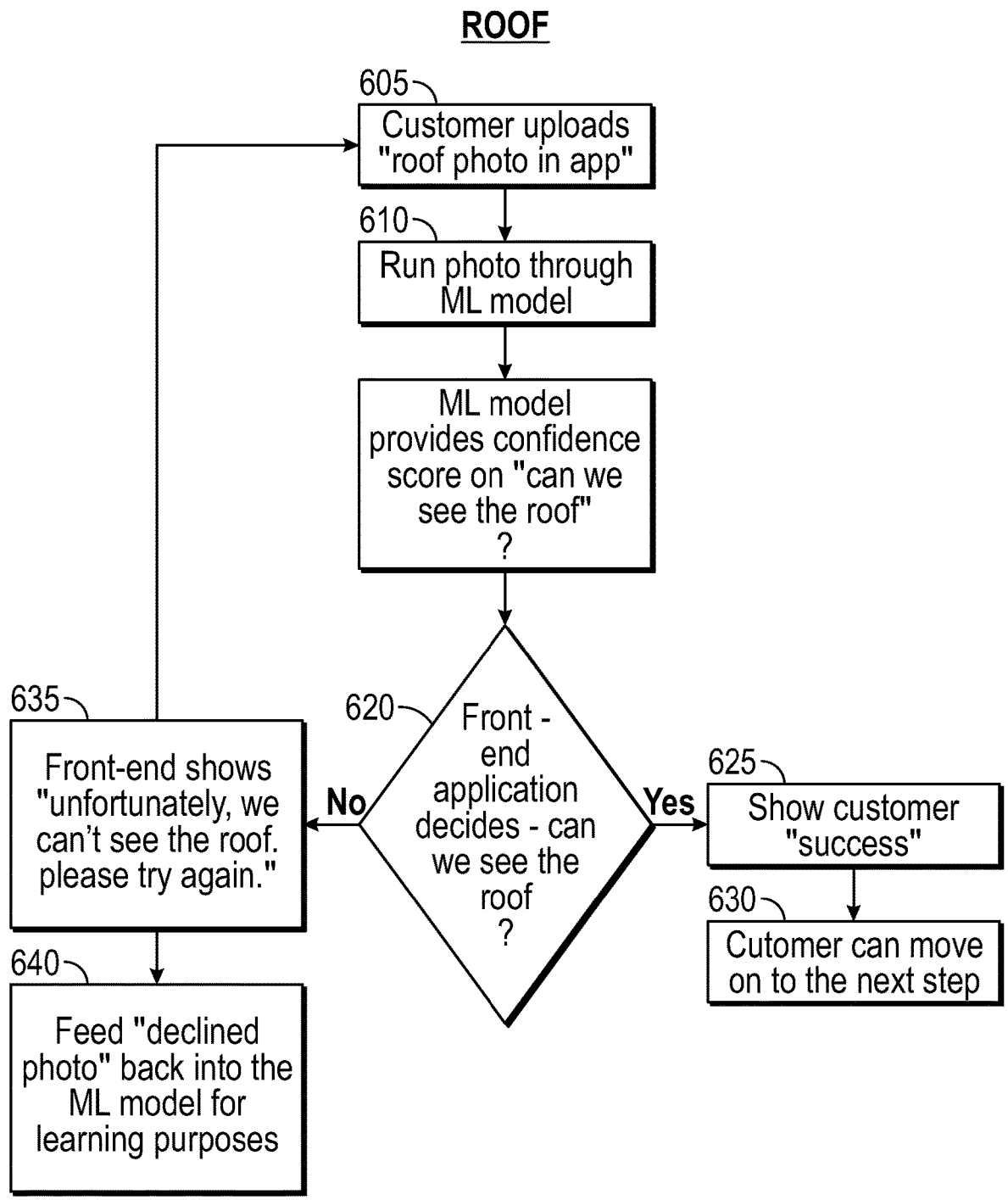
FIG. 6 is an algorithmic flow chart of a method for performing a portion of a remote PV system site survey corresponding to gathering information about a user's roof according to one or more aspects of the disclosed subject matter.

FIG. 6 is an algorithmic flow chart of a method for performing a portion of a remote PV system site survey corresponding to gathering information about a user's roof according to one or more aspects of the disclosed subject matter.

In S605, the system 100 can receive a photo uploaded by a user. For example, the user (e.g., customer) can upload a photo in a software application via the remote device 110. The software application can prompt the user for a roof photo to gather information about a user's roof needed for the remote site survey.

In S610, the system 100 can run the uploaded photo through the trained machine learning algorithm 115.

In S615, the trained machine learning model 115 can provide a confidence score on whether the roof can be seen in the photo.

In S620, the system 100 determines whether the roof can be seen based on the photo. In one aspect, the front-end application determines whether the roof can be seen in the photo based on the confidence scores. In response to a determination that the roof can be seen, the system 100 can indicate to the user that the uploaded photo was acceptable for the portion of the remote site survey corresponding to gathering information about the user's roof in S625. For example, an indication of success can be displayed to the user via the remote device 110.

In S630, the user can proceed to a next step of the site survey. For example, the user can be prompted to take and upload another photo to gather information for a different portion of the site survey.

However, in response to a determination that roof cannot be seen in the photo, the system 100 can provide specific instructions to assist the user in gathering the missing information in S635. In a non-limiting example, the front-end application can display "Unfortunately, we can't see the roof. Please try again." In other words, the front-end application can prompt the user to retake the photo in a way that gathers the information needed for that portion of the remote site survey. After being prompted to retake the photo, the process can return to S605 where the system 100 receives a new photo of the roof uploaded by the user.

In S640, the system 100 can feed the declined photo back into the machine learning model for learning purposes to continuously improve the trained machine learning model 115.

After the user moves on to the next step of the site survey in S630, the process can end.

Figure 7:
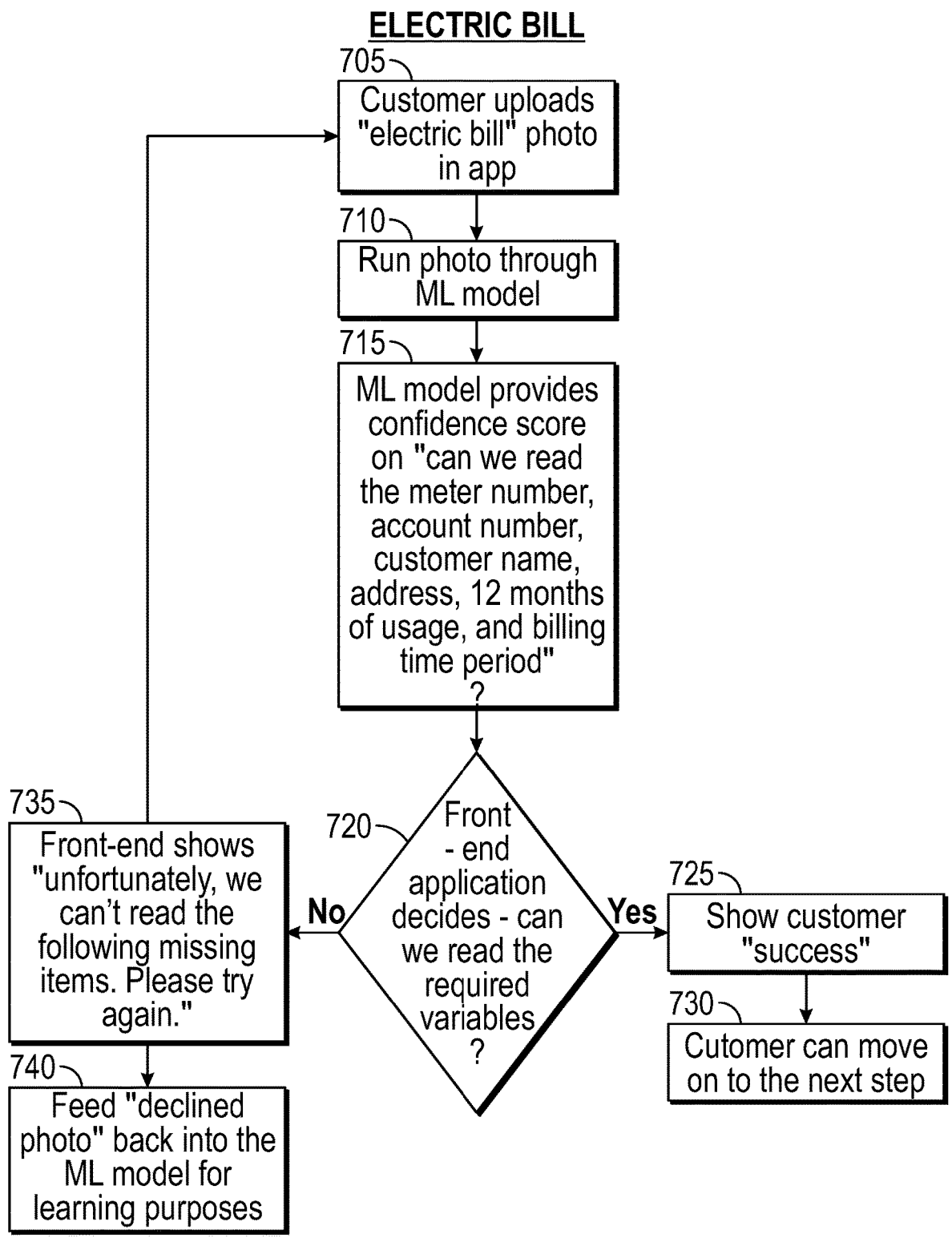
FIG. 7 is an algorithmic flow chart of a method for performing a portion of a remote PV system site survey corresponding to gathering information about a user's electric according to one or more aspects of the disclosed subject matter.

FIG. 7 is an algorithmic flow chart of a method for performing a portion of a remote PV system site survey corresponding to gathering information about a user's electric bill according to one or more aspects of the disclosed subject matter.

In S705, the system 100 can receive a photo uploaded by a user. For example, the user (e.g., customer) can upload a photo in a software application via the remote device 110. The software application can prompt the user for an electric bill photo to gather information about a user's electric bill needed for the remote site survey.

In S710, the system 100 can run the uploaded photo through the trained machine learning algorithm 115.

In S715, the trained machine learning model 115 can provide a confidence score on whether the following can be identified and read in the photo: 1) the meter number, 2) the account number, 3) the customer name, 4) the customer address, 5) 12 months of usage, and 6) billing time period, for example.

In S720, the system 100 determines whether the various electric bill information needed for the site survey can be seen based on the photo. In one aspect, the front-end application determines whether the various electric bill information can be seen in the photo based on the confidence scores. In response to a determination that the various electric bill information can be seen, the system 100 can indicate to the user that the uploaded photo was acceptable for the portion of the remote site survey corresponding to gathering information about the user's electric bill in S725. For example, an indication of success can be displayed to the user via the remote device 110.

In S730, the user can proceed to a next step of the site survey. For example, the user can be prompted to take and upload another photo to gather information for a different portion of the site survey.

However, in response to a determination that one or more items in the electric bill cannot be seen and/or read in the photo, the system 100 can provide specific instructions to assist the user in gathering the missing information in S735. In a non-limiting example, the front-end application can display "Unfortunately, we can't read the following missing items [list of missing items]. Please try again." In other words, the front-end application can prompt the user to retake the photo in a way that gathers the information needed for that portion of the remote site survey. After being prompted to retake the photo, the process can return to S705 where the system 100 receives a new photo of the electric bill uploaded by the user.

In S740, the system 100 can feed the declined photo back into the machine learning model for learning purposes to continuously improve the trained machine learning model 115.

After the user moves on to the next step of the site survey in S730, the process can end.

Figure 8:
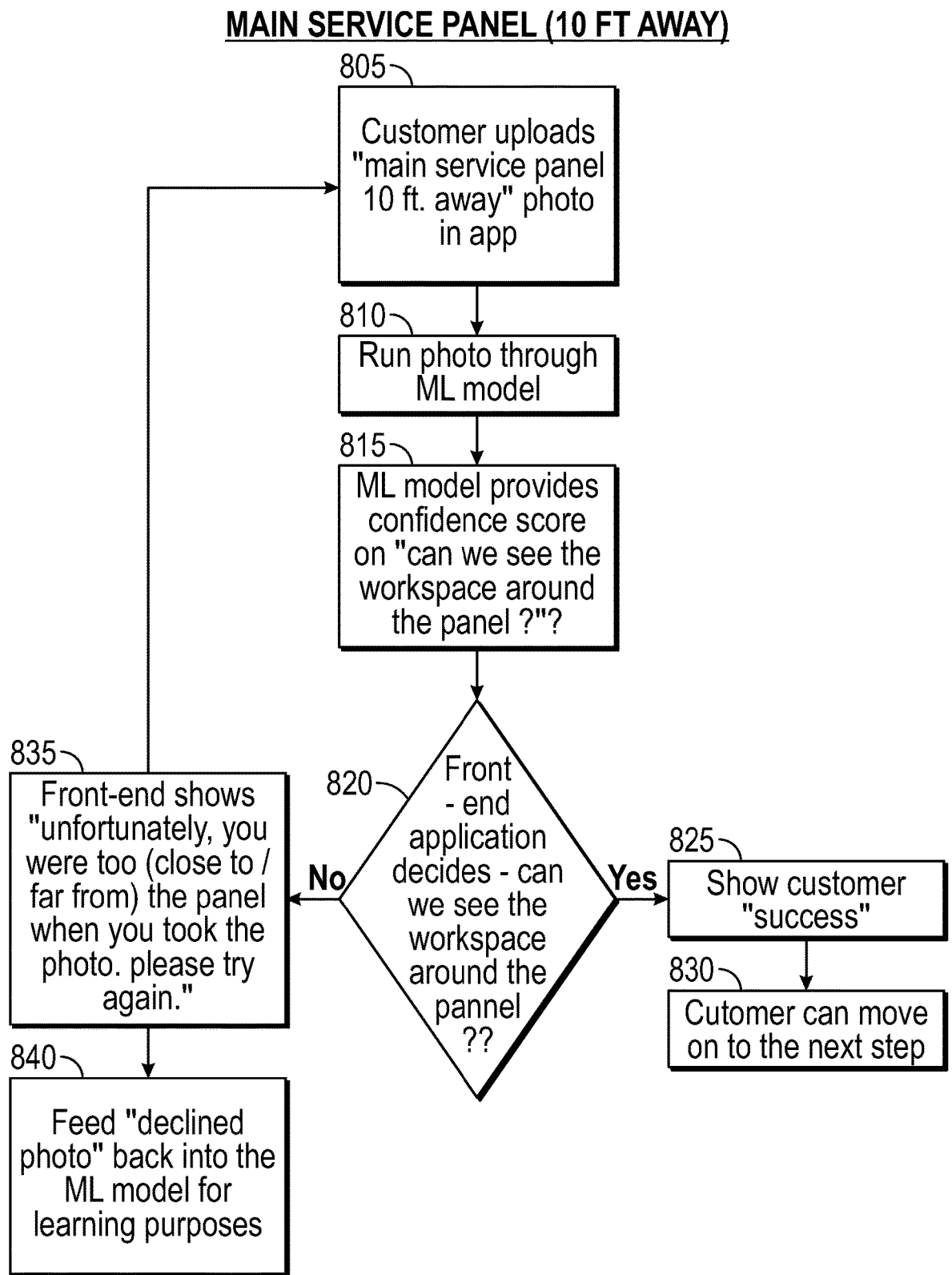
FIG. 8 is an algorithmic flow chart of a method for performing a portion of a remote PV system site survey corresponding to gathering information about a user's main service panel according to one or more aspects of the disclosed subject matter.

FIG. 8 is an algorithmic flow chart of a method for performing a portion of a remote PV system site survey corresponding to gathering information about a user's main service panel according to one or more aspects of the disclosed subject matter.

In S805, the system 100 can receive a photo uploaded by a user. For example, the user (e.g., customer) can upload a photo in a software application via the remote device 110. The software application can prompt the user for a main service panel photo to gather information about a user's main service panel needed for the remote site survey.

In S810, the system 100 can run the uploaded photo through the trained machine learning algorithm 115.

In S815, the trained machine learning model 115 can provide a confidence score on whether a workspace around the main service panel can be seen in the photo. For example, hardware for the PV system is installed near the main service panel so the workspace in the area in which the equipment may be installed needs to be accessible in order to install the equipment.

In S820, the system 100 determines whether the workspace around the main service panel can be seen based on the photo. In one aspect, the front-end application determines whether the workspace around the main service panel can be seen in the photo based on the confidence scores. In response to a determination that the workspace around the main service panel can be seen, the system 100 can indicate to the user that the uploaded photo was acceptable for the portion of the remote site survey corresponding to gathering information about the user's main service panel in S825. For example, an indication of success can be displayed to the user via the remote device 110.

In S830, the user can proceed to a next step of the site survey. For example, the user can be prompted to take and upload another photo to gather information for a different portion of the site survey.

However, in response to a determination that the workspace around the main service panel cannot be seen in the photo, the system 100 can provide specific instructions to assist the user in gathering the missing information in S835. In a non-limiting example, the front-end application can display "Unfortunately, you are too (close to/far from) the panel when you took the photo. Please try again." In other words, the front-end application can prompt the user to retake the photo in a way that gathers the information needed for that portion of the remote site survey. After being prompted to retake the photo, the process can return to S805 where the system 100 receives a new photo of the main service panel uploaded by the user.

In S840, the system 100 can feed the declined photo back into the machine learning model for learning purposes to continuously improve the trained machine learning model 115.

After the user moves on to the next step of the site survey in S830, the process can end.

Figure 9:
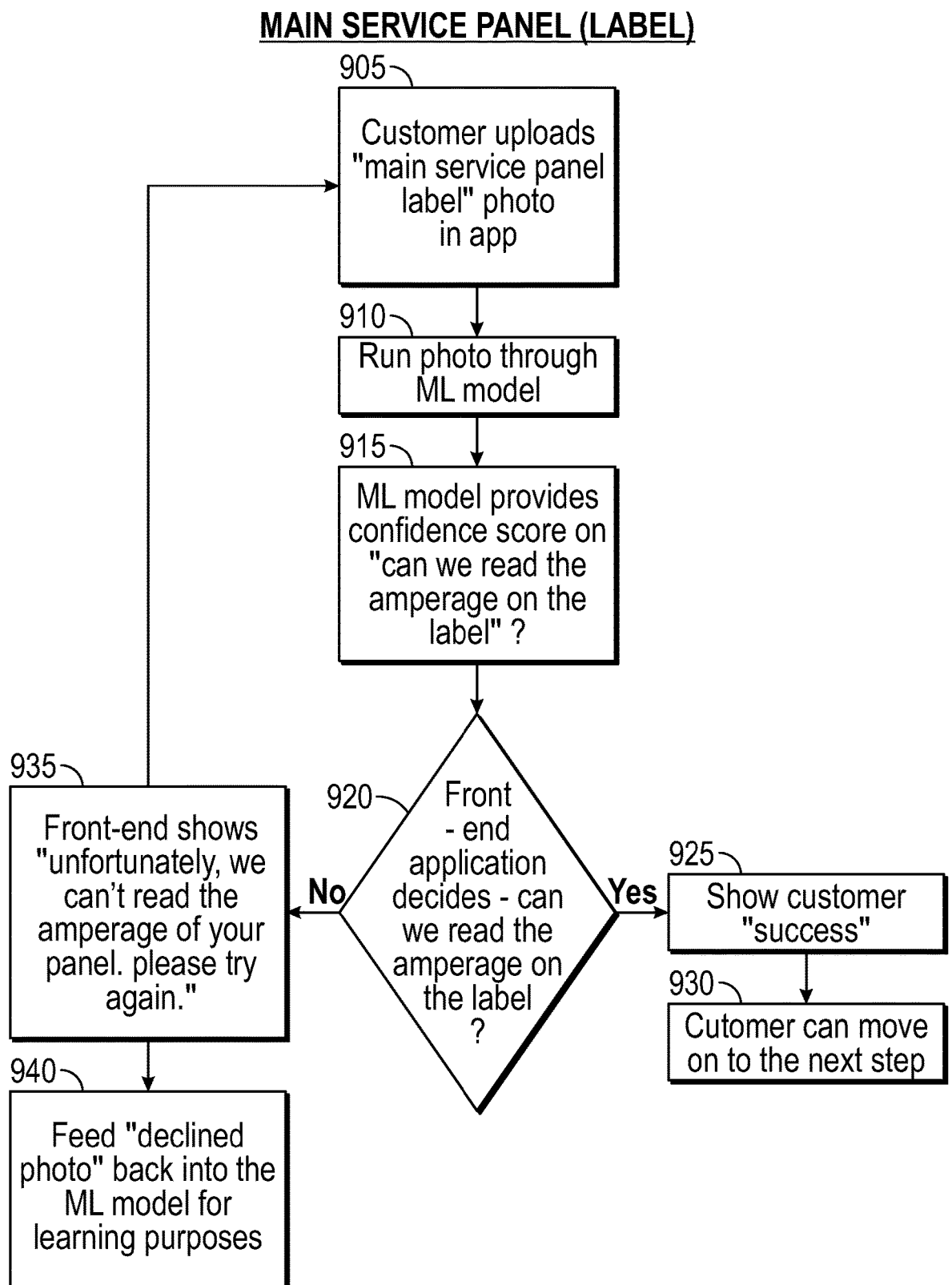
FIG. 9 is an algorithmic flow chart of a method for performing a portion of a remote PV system site survey corresponding to gathering information about a user's main service panel label according to one or more aspects of the disclosed subject matter.

FIG. 9 is an algorithmic flow chart of a method for performing a portion of a remote PV system site survey corresponding to gathering information about a user's main service panel label according to one or more aspects of the disclosed subject matter.

In S905, the system 100 can receive a photo uploaded by a user. For example, the user (e.g., customer) can upload a photo in a software application via the remote device 110. The software application can prompt the user for a main service panel label photo to gather information about a user's main service panel label needed for the remote site survey.

In S910, the system 100 can run the uploaded photo through the trained machine learning algorithm 115.

In S915, the trained machine learning model 115 can provide a confidence score on whether an amperage on the main service panel label can be read in the photo.

In S920, the system 100 determines whether amperage on the main service panel label can be read based on the photo. In one aspect, the front-end application determines whether the amperage on the main service panel label can be read in the photo based on the confidence scores. In response to a determination that the amperage on the main service panel label can be read, the system 100 can indicate to the user that the uploaded photo was acceptable for the portion of the remote site survey corresponding to gathering information about the user's main service panel label in S925. For example, an indication of success can be displayed to the user via the remote device 110.

In S930, the user can proceed to a next step of the site survey. For example, the user can be prompted to take and upload another photo to gather information for a different portion of the site survey.

However, in response to a determination that the amperage on the main service panel label cannot be read in the photo, the system 100 can provide specific instructions to assist the user in gathering the missing information in S935. In a non-limiting example, the front-end application can display "Unfortunately, we can't read the amperage of your panel. Please try again." In other words, the front-end application can prompt the user to retake the photo in a way that gathers the information needed for that portion of the remote site survey. After being prompted to retake the photo, the process can return to S905 where the system 100 receives a new photo of the main service panel label uploaded by the user.

In S940, the system 100 can feed the declined photo back into the machine learning model for learning purposes to continuously improve the trained machine learning model 115.

After the user moves on to the next step of the site survey in S930, the process can end.

Figure 10:
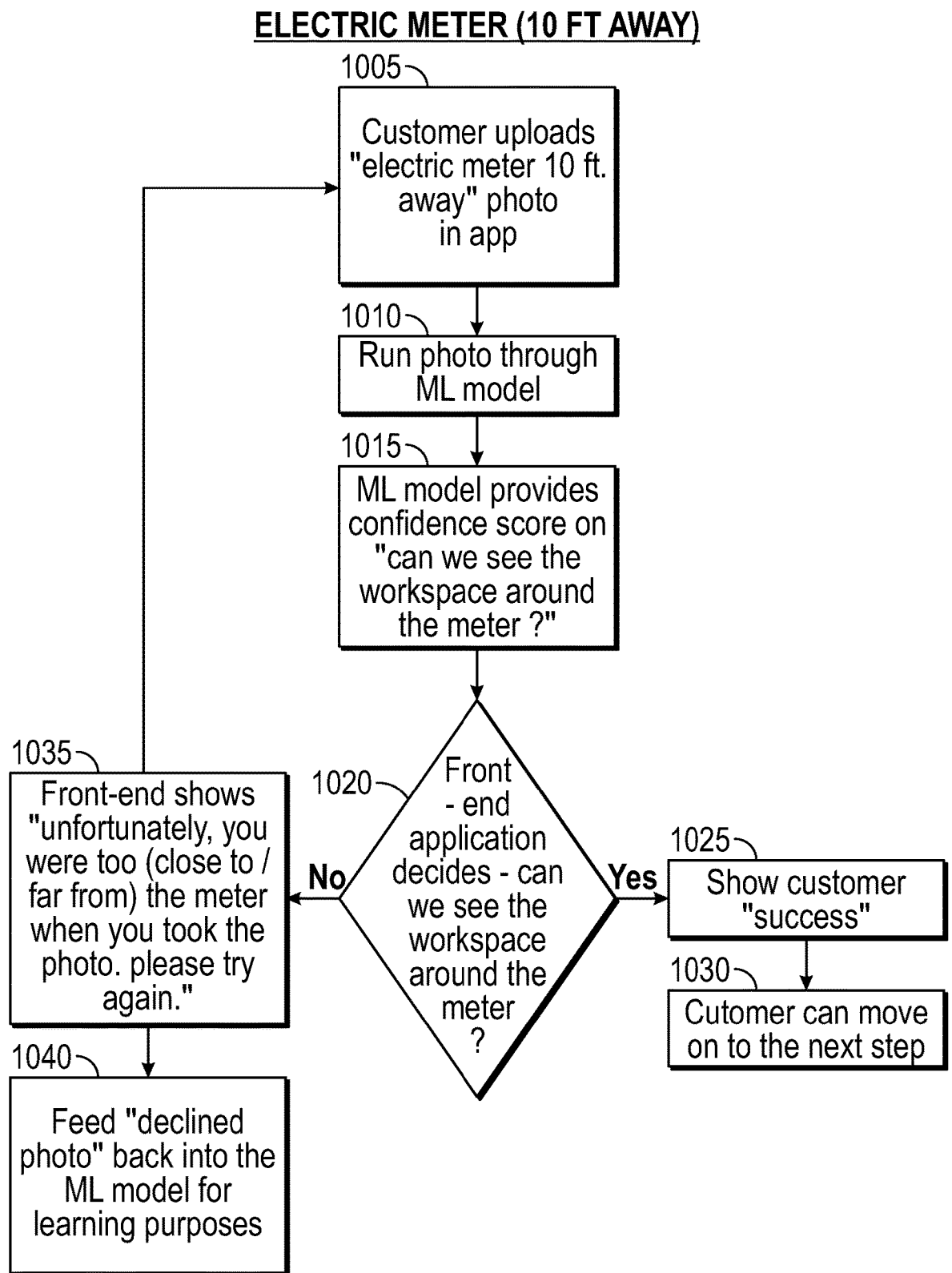
FIG. 10 is an algorithmic flow chart of a method for performing a portion of a remote PV system site survey corresponding to gathering information about a user's electric meter according to one or more aspects of the disclosed subject matter.

FIG. 10 is an algorithmic flow chart of a method for performing a portion of a remote PV system site survey corresponding to gathering information about a user's electric meter according to one or more aspects of the disclosed subject matter.

In S1005, the system 100 can receive a photo uploaded by a user. For example, the user (e.g., customer) can upload a photo in a software application via the remote device 110. The software application can prompt the user for an electric meter photo to gather information about a user's electric meter needed for the remote site survey.

In S1010, the system 100 can run the uploaded photo through the trained machine learning algorithm 115.

In S1015, the trained machine learning model 115 can provide a confidence score on whether a workspace around the electric meter can be seen in the photo.

In S1020, the system 100 determines whether the workspace around the electric meter can be seen based on the photo. In one aspect, the front-end application determines whether the workspace around the electric meter can be seen in the photo based on the confidence scores. In response to a determination that the workspace around the electric meter can be seen, the system 100 can indicate to the user that the uploaded photo was acceptable for the portion of the remote site survey corresponding to gathering information about the user's electric meter in S1025. For example, an indication of success can be displayed to the user via the remote device 110.

In S1030, the user can proceed to a next step of the site survey. For example, the user can be prompted to take and upload another photo to gather information for a different portion of the site survey.

However, in response to a determination that workspace around the electric meter cannot be seen in the photo, the system 100 can provide specific instructions to assist the user in gathering the missing information in S1035. In a non-limiting example, the front-end application can display "Unfortunately, you were too (close to/far from) the electric meter when you took the photo. Please try again." In other words, the front-end application can prompt the user to retake the photo in a way that gathers the information needed for that portion of the remote site survey. After being prompted to retake the photo, the process can return to S1005 where the system 100 receives a new photo of the electric meter uploaded by the user.

In S1040, the system 100 can feed the declined photo back into the machine learning model for learning purposes to continuously improve the trained machine learning model 115.

After the user moves on to the next step of the site survey in S1030, the process can end.

Figure 11:
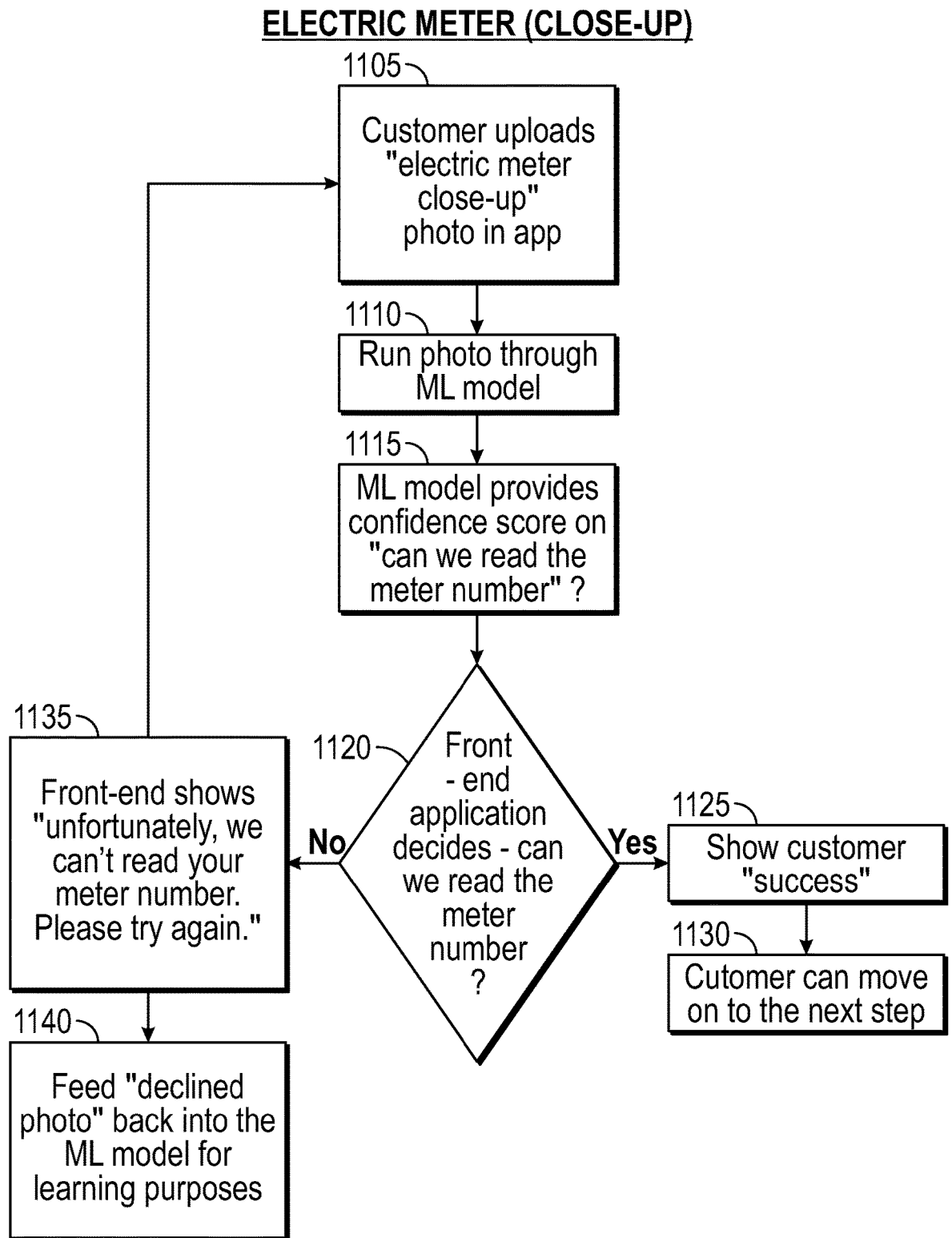
FIG. 11 is an algorithmic flow chart of a method for performing a portion of a remote PV system site survey corresponding to gathering information about a user's electric meter according to one or more aspects of the disclosed subject matter.

FIG. 11 is an algorithmic flow chart of a method for performing a portion of a remote PV system site survey corresponding to gathering information about a user's electric meter according to one or more aspects of the disclosed subject matter.

In S1105, the system 100 can receive a photo uploaded by a user. For example, the user (e.g., customer) can upload a photo in a software application via the remote device 110. The software application can prompt the user for a close-up electric meter photo to gather information about a user's electric meter needed for the remote site survey.

In S1110, the system 100 can run the uploaded photo through the trained machine learning algorithm 115.

In S1115, the trained machine learning model 115 can provide a confidence score on whether the meter number of the electric meter can be read in the photo.

In S1120, the system 100 determines whether the meter number of the electric meter can be read based on the photo.

In one aspect, the front-end application determines whether the meter number of the electric meter can be read in the photo based on the confidence scores. In response to a determination that the meter number of the electric meter can be read, the system 100 can indicate to the user that the uploaded photo was acceptable for the portion of the remote site survey corresponding to gathering information about the user's electric meter number in S1125. For example, an indication of success can be displayed to the user via the remote device 110.

In S1130, the user can proceed to a next step of the site survey. For example, the user can be prompted to take and upload another photo to gather information for a different portion of the site survey.

However, in response to a determination that the meter number of the electric meter cannot be read in the photo, the system 100 can provide specific instructions to assist the user in gathering the missing information in S1135. In a non-limiting example, the front-end application can display "Unfortunately, we can't read your meter number. Please try again." In other words, the front-end application can prompt the user to retake the photo in a way that gathers the information needed for that portion of the remote site survey. After being prompted to retake the photo, the process can return to S1005 where the system 100 receives a new photo of the electric meter (close-up) uploaded by the user.

In S1140, the system 100 can feed the declined photo back into the machine learning model for learning purposes to continuously improve the trained machine learning model 115.

After the user moves on to the next step of the site survey in S1130, the process can end.

It should be appreciated that FIGS. 5-11 can be executed in any order and are not limited to executed sequentially as illustrated.

In the above description of FIGS. 4-11, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 12:
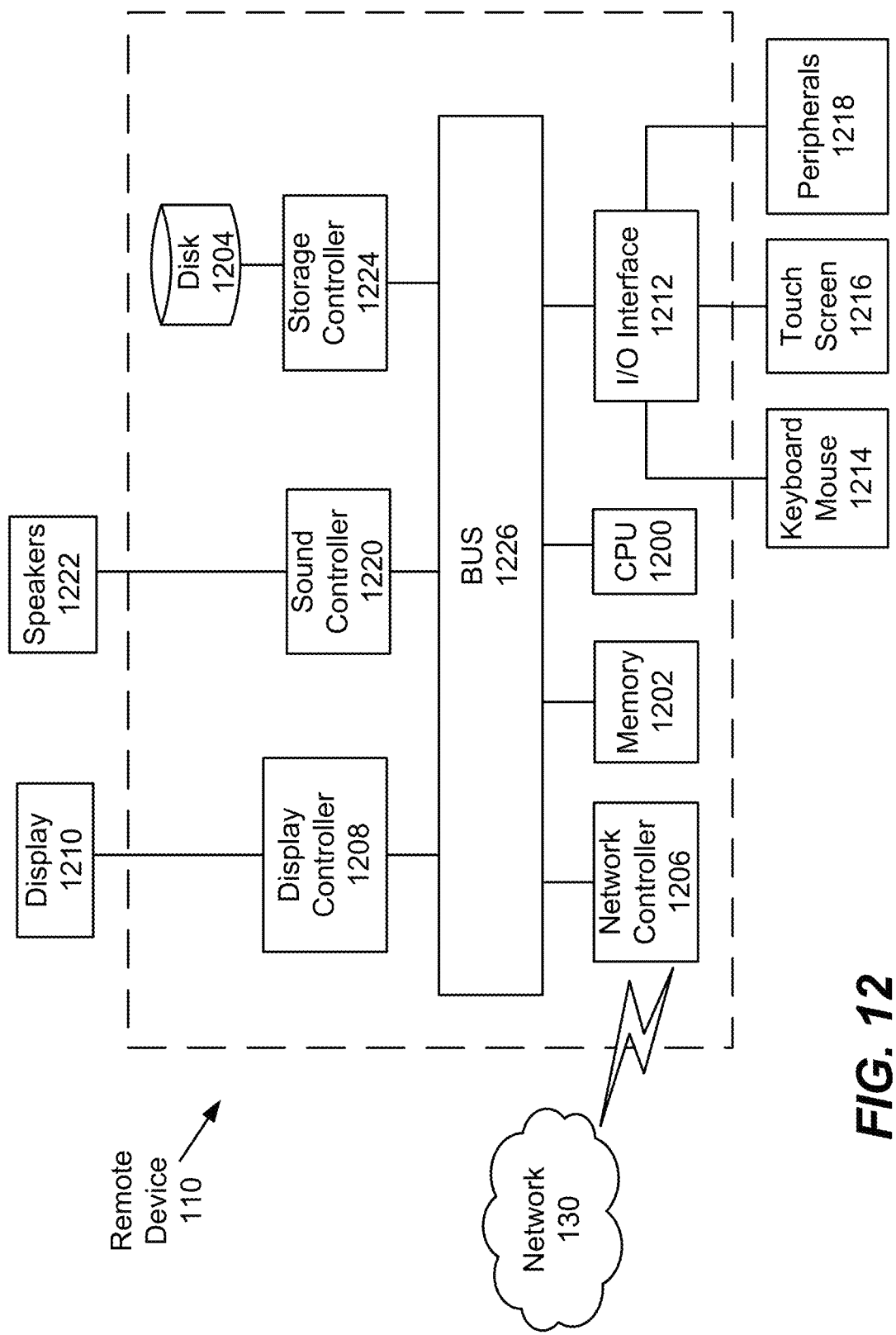
FIG. 12 is a hardware block diagram of a remote device according to one or more exemplary aspects of the disclosed subject matter.

Next, a hardware description of a device (such as the server 105 or the remote device 110) according to exemplary embodiments is described with reference to FIG. 12. The hardware description described herein can also be a hardware description of the processing circuitry. In FIG. 12, the remote device 110 includes a CPU 1200 which performs one or more of the processes described above/below. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the remote device 110 communicates, such as a server or computer.

Further, the claimed advancements may be provided as a utility application, background daemon, or component of an operating system, or combination thereof, executing in conjunction with CPU 1200 and an operating system such as Microsoft Windows, UNIX, Solaris, LINUX, Apple MAC-OS and other systems known to those skilled in the art.

The hardware elements in order to achieve the remote device 110 may be realized by various circuitry elements. Further, each of the functions of the above described embodiments may be implemented by circuitry, which includes one or more processing circuits. A processing circuit includes a particularly programmed processor, for example, processor (CPU) 1200, as shown in FIG. 12. A processing circuit also includes devices such as an application specific integrated circuit (ASIC) and conventional circuit components arranged to perform the recited functions.

In FIG. 12, the remote device 110 includes a CPU 1200 which performs the processes described above. The remote device 110 may be a general-purpose computer or a particular, special-purpose machine. In one embodiment, the remote device 110 becomes a particular, special-purpose machine when the processor 1200 is programmed to perform a PV system site survey remotely (and in particular, any of the processes discussed with reference to FIGS. 4-11).

Alternatively, or additionally, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The remote device 110 in FIG. 12 also includes a network controller 1206, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The remote device 110 further includes a display controller 1208, such as a graphics card or graphics adaptor for interfacing with display 1210, such as a monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners.

A sound controller 1220 is also provided in the remote device 110 to interface with speakers/microphone 1222 thereby providing sounds and/or music.

The general-purpose storage controller 1224 connects the storage medium disk 1204 with communication bus 1226, which may be an ISA, EISA, VESA, PCI, or similar, for interconnecting all of the components of the remote device 110. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method, comprising:
receiving a photograph uploaded by a user device;
analyzing the photograph using a trained machine learning model;
receiving a confidence score from the trained machine learning model;
determining if the photograph includes predetermined information, the predetermined information being used to perform a remote photovoltaic (PV) system site survey remotely; and
in response to a determination that the photograph does not include the predetermined information, providing specific instructions regarding the missing information, wherein the specific instructions include guidance on how to retake the photograph to capture the predetermined information.

2. The method of claim 1, wherein receiving the photograph uploaded by a user device includes receiving a photo of an attic.

3. The method of claim 2, wherein determining the predetermined information for the photo of the attic used for remotely performing the PV system site survey includes determining, based on a first corresponding confidence score, whether the user is taking the photo in the attic; and determining, based on a second corresponding confidence score, whether a rafter span, length, and height can be determined based on the photo of the attic.

4. The method of claim 1, wherein receiving the photograph uploaded by a user device includes receiving a photo of a roof.

5. The method of claim 4, wherein determining the predetermined information for the photo of the roof used for remotely performing the PV system site survey includes determining whether the roof is visible in the photo of the roof.

6. The method of claim 1, wherein receiving the photograph uploaded by a user device includes receiving a photo of an electric bill.

7. The method of claim 6, wherein determining the predetermined information for the photo of the electric bill used for remotely performing the PV system site survey includes determining whether a meter number, an account number, a customer name, a customer address, a usage over twelve months, and a billing time period are legible in the photo of the electric bill.

8. The method of claim 1, wherein receiving the photograph uploaded by a user device includes receiving a photo of a main service panel from a predetermined distance away.

9. The method of claim 8, wherein determining the predetermined information for the photo of the main service panel from the predetermined distance away used for remotely performing the PV system site survey includes determining whether a predetermined amount of space exists around the main service panel in the photo of the main service panel.

10. The method of claim 1, wherein receiving the photograph uploaded by a user device includes receiving a photo of a main service panel label.

11. The method of claim 10, wherein determining the predetermined information for the photo of the main service panel label used for remotely performing the PV system site survey includes determining whether an amperage is legible in the photo in the main service panel label.

12. The method of claim 1, wherein receiving the photograph uploaded by a user device includes receiving a photo of an electric meter from a first predetermined distance away.

13. The method of claim 12, wherein determining the predetermined information for the photo of the electric meter from the first predetermined distance away used for remotely performing the PV system site survey includes determining whether a predetermined amount of space exists around the electric meter in the photo of the electric meter.

14. The method of claim 13, wherein receiving the photograph uploaded by a user device includes receiving a photo of an electric meter from a second predetermined distance away, the second predetermined distance being less than the first predetermined distance.

15. The method of claim 14, wherein determining the predetermined information for the photo of the electric meter from the second predetermined distance away used for remotely performing the PV system site survey includes determining whether a meter number is legible in the photo of the electric meter.

16. The method of claim 1, further comprising:

in response to the determination that the photograph does not include the predetermined information, feeding the photograph that does not include the predetermined information back into the trained machine learning model.

17. One or more computer readable medium including computer program instructions, which when executed by an information processing system, cause the system to:

receive a photograph uploaded by a user device;

analyze the photograph using a trained machine learning model;

receive a confidence score from the trained machine learning model;

determine if the photograph includes predetermined information, the predetermined information being used to perform a remote photovoltaic (PV) system site survey remotely; and in response to a determination that the photograph does not include the predetermined information, provide specific instructions regarding the missing information, wherein the specific instructions include guidance on how to retake the photograph to capture the predetermined information.

18. The one or more computer readable medium of claim 17, wherein the information processing system is a server.

19. The one or more computer readable medium of claim 17, wherein the information processing system is a cloud-based architecture.

20. A server, comprising:

processing circuitry configured to receive a photograph uploaded by a user device;

analyze the photograph using a trained machine learning model;

receive a confidence score from the trained machine learning model;

determine if the photograph includes predetermined information, the predetermined information being used to perform a remote photovoltaic (PV) system site survey remotely; and in response to a determination that the photograph does not include the predetermined information, provide specific instructions regarding the missing information, wherein the specific instructions include guidance on how to retake the photograph to capture the predetermined information.

* * * * *